United States Patent
Yoo et al.

(10) Patent No.: US 7,890,522 B2
(45) Date of Patent: Feb. 15, 2011

(54) RECORD MEDIA WRITTEN WITH DATA STRUCTURE FOR RECOGNIZING A USER AND METHOD FOR RECOGNIZING A USER

(75) Inventors: Dong-Hyun Yoo, Seongnam-si (KR); Byung-Ju Dan, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1133 days.

(21) Appl. No.: 11/594,930

(22) Filed: Nov. 9, 2006

(65) Prior Publication Data

US 2007/0106424 A1 May 10, 2007

(30) Foreign Application Priority Data

| Nov. 10, 2005 | (KR) | ................. | 10-2005-0107670 |
| Nov. 21, 2005 | (KR) | ................. | 10-2005-0111483 |
| Nov. 21, 2005 | (KR) | ................. | 10-2005-0111484 |
| Nov. 21, 2005 | (KR) | ................. | 10-2005-0111491 |

(51) Int. Cl.
  *G06F 7/00* (2006.01)
  *G06F 17/30* (2006.01)
(52) U.S. Cl. ..................... 707/758; 707/793
(58) Field of Classification Search ............ 726/17; 707/758
See application file for complete search history.

(56) References Cited

U.S. PATENT DOCUMENTS

| 6,400,845 | B1 * | 6/2002 | Volino | 382/176 |
| 7,426,639 | B2 * | 9/2008 | Ishiguro | 713/175 |
| 2004/0151347 | A1 * | 8/2004 | Wisniewski | 382/115 |
| 2004/0151396 | A1 * | 8/2004 | Nomura et al. | 382/254 |
| 2004/0160635 | A1 * | 8/2004 | Ikeda et al. | 358/1.15 |
| 2006/0204058 | A1 * | 9/2006 | Kim et al. | 382/118 |

* cited by examiner

*Primary Examiner*—John R. Cottingham
*Assistant Examiner*—Nicholas E Allen
(74) *Attorney, Agent, or Firm*—Harness, Dickey & Pierce, P.L.C.

(57) ABSTRACT

The present invention relates to a record media written with a data structure used in recognizing specific users in hardware such as a robot, etc., a method for recognizing a user by using a data structure written in the record media, and a user identification database access method for the user identification software component application programming interface (API) and an error handling method in the user identification software component API. Among the user identification elements, in particular, the present invention relates to a method for building a database of image data for the user's clothes, and a performance evaluation of a vision-based recognizer, which is means for recognizing the user's image information for the clothes.

1 Claim, 4 Drawing Sheets

| DATA LENGTH (411) | HEADER VERSION (412) | DATA TYPE (413) | DATA FORMAT (414) | INFORMATION ON OBJECT INDENTIFICATION ELEMENT(415) |
|---|---|---|---|---|

RECORD MEDIA WRITTEN WITH DATA STRUCTURE FOR RECOGNIZING A USER AND METHOD FOR RECOGNIZING A USER

CROSS-REFERENCE TO RELATED APPLICATIONS

This application claims the benefit of Korean Patent Application Number 10-2005-0107670, filed Nov. 10, 2005; Korean Patent Application Number 10-2005-0111484, filed Nov. 21, 2005; Korean Patent Application Number 10-2005-0111483, filed Nov. 21, 2005, and Korean Patent Application Number 10-2005-0111491, filed Nov. 21, 2005, which are hereby incorporated by reference as if fully set forth herein.

BACKGROUND OF THE INVENTION

1. Field of the Invention

The present invention relates to a record media written with a data structure, used in recognizing specific users, in hardware such as a robot, etc., a method for recognizing a user by using a data structure written in the record media, and a method for accessing to a user identification database in the user identification software component application programming interface (API) and an error handling method in the user identification software component API. Among the user identification elements, in particular, the present invention relates to a method for building a database of image data relating to the user's clothes, and a performance evaluation of a vision-based recognizer, which is means for recognizing the user's image information relating to the clothes.

2. Description of the Related Art

From the 1980's, the market of an industrial robot has rapidly grown on the basis of the development of labor-intensive industries, such as a car and electronics industry, etc., and the market of the industrial robot has expanded in full-scale since the robot was significantly utilized in manufacturing plants. However, since the market of the industrial robot has reached puberty in the early 1990's, the market of the industrial robot has become sluggish. Therefore, this sluggish market paved the way for seeking the formation of a new field of a robot industry and the technical development thereof. Recently, as the social requests for a housewife's daily work or a life-support have been expanded and a society is rapidly aging, this new field of robots has been developing into a service robot type for actively coping with the changing circumstance and providing a very useful service for a human being, by moving away from the idea of the industrial robot doing simply repetitive work in an existing fixed circumstance. In particular, this field of robots has been forming the market of a new robot such as an intelligent service robot on the basis of information and communication technology together with the remarkable development of semiconductors, as well as computer and communication technology. For example, the commercialization of an intelligent service robot starting from a pet robot A of S company paved the way for expanding the recognition of roles as entertainment and a companion of a human being, by escaping from the concept that a robot is used only in the field to replace human labor.

The domestic intelligent service robot industry is releasing elementary intelligent robot products such as an entertainment robot and a home robot, etc., from more than twenty venture companies. Meanwhile, large enterprises are attempting the independently technical development of the intelligent robot together with the technical development of intelligent home appliances. S company has developed a toy robot ANTOR, a home robot iComar™, and iMaro™, a successor thereto so that it is preparing commercialization thereof within one to two years. L Company has released a cleaning robot Roboking™.

In particular, large enterprises are expected to overcome the disparity in technology level with the existing small scale leading enterprises and to lead in this field, preceded by the technologies for relatively various business fields and the abundant research personnel and capital.

The domestic industrial robot, ranking fourth in the world production-wise, has been helpful in strengthening competitiveness of manufacturing industries such as semiconductors and cars, etc. However, the domestic industrial robot has lower competitiveness than that of advanced countries due to high dependence on foreign technology and core components of the domestic industrial robot and the existing industry are currently losing growth momentum due to recent industry depression. Since 2000 many small or mid-sized venture companies are developing robots for home, entertainment, education and service, etc., for commercialization, according to the world-wide trend of robot industry, and Robot World Cup and I'REX, etc., are well established for domestic applications so that the possibility of industrialization for the domestic intelligent robot is gradually increased. D Company has released a humanoid robot with 16 joints, LUCY™, and a plurality of robots for education and research, by using low-cost RC servo motor, R Company has released growth toy robots in a mouse shape, DIDI™ and TITI™, and a gladiator robot for combat. Microrobot INC. has been commercializing a robot kit for education and a robot for games, and has been developing a module-type robot as a development task of a next generation robot technology. Woori technology INC. has developed and exhibited a guiding and cleaning robot for home use, ISAAC™, and has released a cleaning robot. It has also been developing a public exhibition robot as an upcoming technology. Y Company has commercialized a soccer robot, VICTO™, has developed educational robots for home use, Pegasus and iRobi™, and has been preparing for the commercialization thereof. H Company has commercialized a robot for research and a soccer robot, and has also developed a robot for national defense and a cleaning robot, OTTORO™. And other many enterprises have been contributing to industrialization centering on educational and toy robots.

According to IT New Growth Engine Planning Report, an intelligent service robot has been named a ubiquitous robotic companion (hereinafter, referred to as 'URC') and is made to promote industry revitalization and technology development based on business model. Herein, 'URC' is defined as "a robot for being with me when, wherever and always and providing a service necessary for me" so that various functions of high degree or services can be provided by introducing the URC concept by adding a network to the existing concept of a robot, and in which transition and human interface are remarkably improved, such that the possibility that various services and pleasures are provided at more inexpensive cost on the user side is expected to be largely expanded. In terms of a URC, it should be connected with network infra, thus having intelligence. And, in view of mobility, it is further considered to include hardware mobility as well as software mobility.

The URC connecting a robot with a network has been proposing new possibility of overcoming the limitation in terms of maintaining and of seeking the growth of a robot industry. In an existing robot, all required functions and technical burdens are resolved in the existing robot itself so that the technical limitation and the problem of cost occur, however, the cost can be reduced and the usefulness can be improved by sharing the functions with the outside through a network. In other words, the functional possibility resulting from the development of IT technology is added to a robot so that a pro-human human interface is secured, having a more free shape and various mobility, such that it is able to be developed into a robot industry on the basis of the people oriented technology.

It is necessary for such a pro-human robot to have an ability to recognize a person interacting with the robot. The robot can recognize a user through a variety of information by using a voice or an image and at this time, each method constitutes one component and a robot application program can recognize a user by using a plurality of components. The company providing the components provides the method capable of recognizing a user in an API function library form by using their own peculiar method and technology, wherein if the functions of the function library are defined in a different form according to companies, the robot application program has a problem to modify programs whenever component suppliers are changed. After all, the overlapping development of the robot application program is inevitable and thus, it is considered to be one of the major factors to hamper the development of the robot technology.

Figure 1:
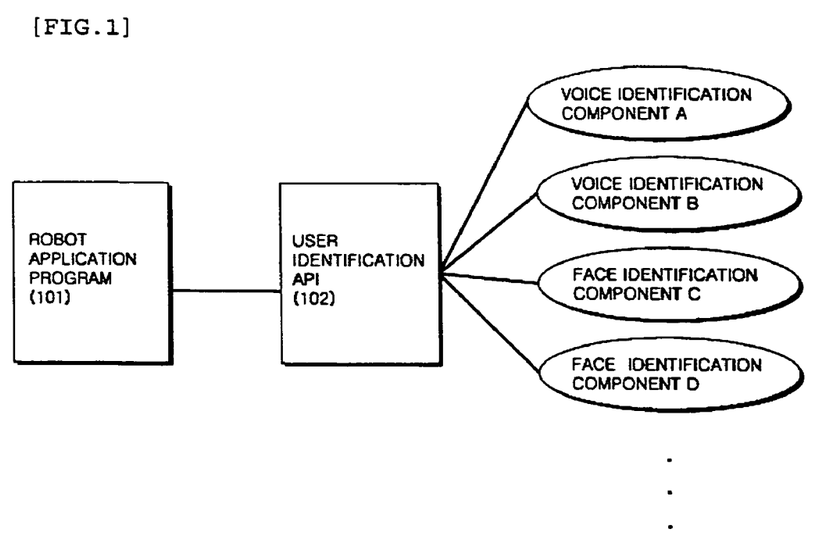
FIG. 1 is a concept diagram of a user identification software component API structure.

As the most representative method to solve the problems as above, the components may be used with only minimum change, without modifying the robot application program by preparing a common standard of API functions of the components supplied by the companies. In other words, as shown in FIG. 1, the standard of API functions 102 of the components provided by various companies is set so that it may be used in the robot application program 101, even if any component is used.

In the API for recognizing a user, in particular, there is data having information for the recognition of the user so that it is possible to recognize specific users by comparing the data. The form of data as above should be defined in a common form for various components.

Also, in the API for recognizing a user, all functions should report the results of proper success or error depending on the operation or not of the function. Therefore, it should prevent the confusion from occurring by determining kinds of errors to be generated for each component and unifying the definitions for the errors.

In general, a robot captures information by using a voice or an image in order to recognize a person interacting with the robot, in particular, a robot apparatus or a viewing camera such as an intelligent service robot recognizes a person or a thing by capturing image information so that an image identification method for finding and pursuing a person in an image and a system thereof have been actively developing.

The information of a person such as a face, a gait, a height etc., is used to recognize and pursue the person. In particular, person's clothes having characteristics to be standardized in view of colors and shapes, can be easily recognized from the captured image so that it can be useful in recognizing and pursuing a person.

For the above reasons, various methods using the image information of clothes have recently been proposed for recognizing and pursuing a person. However, the various methods proposed as above do not have a common standard to objectively evaluate a performance of recognizing a person by using the image information of clothes, as such having difficulty in comparing the performance.

Therefore, the standard or the method to objectively evaluate the performance of methods to recognize a person by using the image information of clothes is necessary.

SUMMARY OF THE INVENTION

A record media written with a data structure for recognizing a user according to the present invention stores a data structure that comprises a header region storing data information and a data region storing object identification data. A method for recognizing a user according to the present invention recognizes the users by including the processes of: enrolling users by representing user identification data with a data structure; newly measuring and collecting the user identification data with the data structure; matching the user identification data newly measured and collected with the user identification data enrolled; and judging from the matched results whether they are matched or not. According to the present invention, a data structure is defined, which can generally represent data for various user identification elements represented in various data formats.

Also, the present invention provides a method capable of performing functions, such as storage, addition, and deletion of templates, etc. in a database by defining user identification database access functions in a user identification S/W component API and a method capable of preventing the confusion between the users of the API and the manufacturers of the component by defining kinds of errors when the errors occur among values returned by each function in the user identification S/W component API.

In particular, the present invention provides a method for building a database of clothes images for vision-based identification by capturing image data for different clothes in colors or textures among various user identification records under different lighting and for evaluating a performance of a vision-based recognizer by comparing the image information of clothes captured by the vision-based recognizer with the data in the database of the clothes images which was previously built.

BRIEF DESCRIPTION OF THE DRAWINGS

Other objects and aspects of the present invention will become apparent from the following description of embodiments with reference to the accompanying drawings in which.

DETAILED DESCRIPTION OF PREFERRED EMBODIMENTS

Hereinafter, preferred embodiments of the present invention will be described with reference to the drawings. In designating reference numbers to components in the following drawings, the same reference numbers indicate the same components in different figures. The detailed description of known functions and configurations will be omitted so as not to obscure the subject of the present invention with unnecessary detail.

Figure 2:
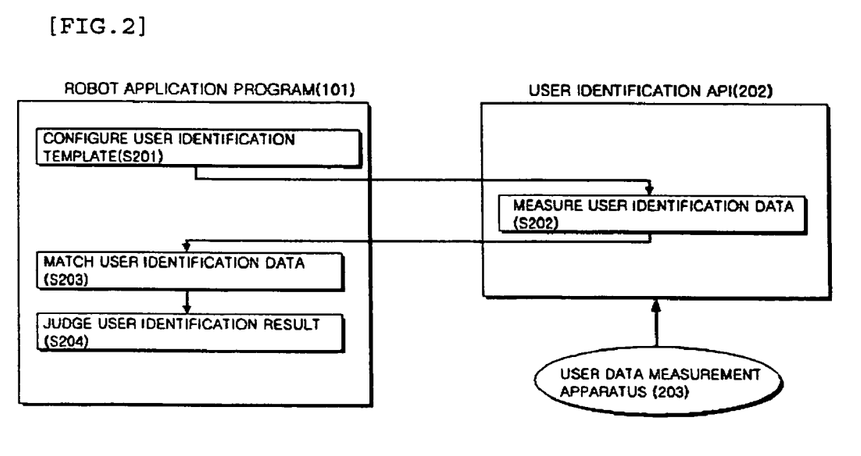
FIG. 2 is a flow chart showing one embodiment of a method for recognizing specific users according to the present invention.

FIG. 1 shows a concept of a software component API structure for recognizing a user. FIG. 2 is a flow chart showing a process for performing one embodiment of a method for recognizing specific users of the present invention in a user identification software component API structure.

In the embodiment, a robot common framework comprises a robot application program 201 and a user identification API 202. The user identification API 202 collects data from an apparatus 203 for measuring data, such as a sensor apparatus, etc. then transfers it to the robot application program 201, wherein the robot application program 201 processes the data transferred from the user identification API 202 to recognize users based on the processed results.

In the case of performing a process for recognizing specific users in the robot common framework, the process first collects, as a sample, initial data for the specific users in the user identification API 202 and the user data measurement apparatus 203, and then configures and stores a user identification data templates from the collected initial data in the robot application program 201 (S201). In particular, the user identification data templates are configured of the same data structure as that written in a record media in which a data structure for recognizing a user according to the present invention is written. The data structure written in the record media will be described with reference to FIG. 3 and FIG. 4.

The collected initial data indicates the features of the specific user and the user identification data templates are configured of characteristic data capable of identifying the specific user. The user identification data templates are stored in the robot application program 201 to enroll the specific users in the database. The users are enrolled and the user identification data for any users is then measured to judge whether the data corresponds to any one of the users enrolled.

Then, the user identification API 202 captures new data for any users by using the user data measurement apparatus 203 (S202).

The data captured is processed to be in a useable form and is then subject to a verification process to be matched with the user identification data templates (S203). Preferably, the verification process is performed in the robot application program 201 storing the user identification data templates. The verification process matches the newly captured data with the user identification data to output a list of the matched results. In particular, in making the newly captured data to be matched with the user identification data templates, it is configured in the form of the data structure written in the record media of the present invention as will be described below.

An identification process is performed to judge whether the users capturing the new data from the matched results correspond to any one of the users enrolled (S204). The identification process judges whether the users of the newly captured data from the list of the matched results output from the verification process correspond to any one of the users enrolled by configuring and storing the user identification data templates.

The identification process for users near a robot, such as users interacting with the robot is performed through the process as in the embodiment of FIG. 2. The method for recognizing a user as above is defined in the user identification SW component API structure.

In particular, the API is provided as a user identification API (RuicAPI: Robot User Identification Component API) by a developer using a standard interface. The user identification API uses a user identification record (UIR), which is information on users.

As the user identification record, there are an image, a voice, and other various kinds of data. In particular, in recognizing users interacting with a robot, the user identification records are represented with data for each of various kinds of user identification elements, such as a face, a voice, a height, clothes, colors, movement of lips, a gait of a user, and a user identification code, etc.

The user identification API may use the user identification records in different forms in accordance with developer providing it. It is necessary to define the data structure representing the user identification records, which can generally be applied to each of the user identification API provided by a variety of developers.

Figure 3:
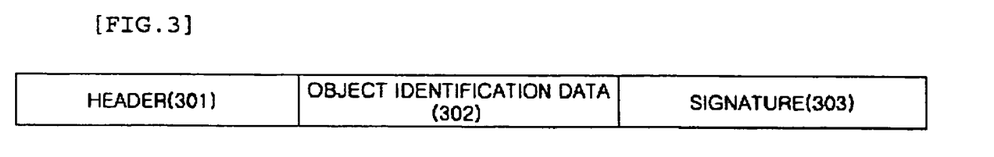
FIG. 3 and FIG. 4 show data structures written in a record media according to one embodiment of the present invention in which a data structure for recognizing an object is written.
Figure 4:
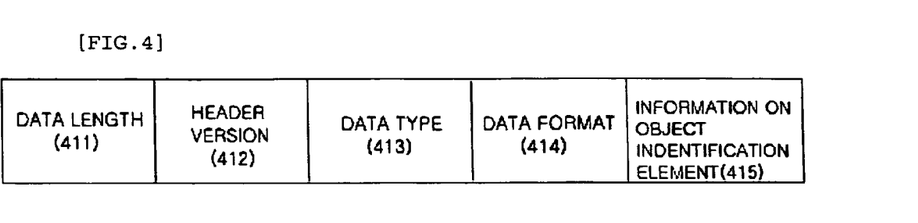

FIG. 3 and FIG. 4 show data structures written in a record media according to one embodiment of the invention present in which a data structure for recognizing an object is written. In particular, FIG. 3 shows the whole configurations of a data structure and FIG. 4 shows in more detail a header part in the configurations of FIG. 3. The user identification records are represented with the data structures of FIG. 3 and FIG. 4.

In FIG. 3, the user identification data for the user identification records are represented with the data structure that comprises a header region 301 storing information on a length, a kind, and a format of the user identification data, a data region 302 storing the user identification data, and a signature region 303 storing a digital signature for the security of the user identification data.

In FIG. 4, the header region 301 is configured of a field 411 storing data length (size) information of the user identification data stored in the data region 302, a field 412 storing header version information, a field 413 storing information on data types representing the user identification data, a field 414 storing information on data formats of the user identification data, and a field 415 storing information on the user identification elements corresponding to the user identification data.

The field 413 storing information on data types representing the user identification data stores information on whether or not the data structure is digitally signed or on whether or not the user identification data stored in the data region 302 are encrypted, information on a data processing speed and data processing states (raw, intermediate, processed, etc), and information on encryption methods in the case that encryption is performed.

The field 414 storing information on data formats of the user identification data stores information on data representing methods for representing the user identification data stored in the data region 302. Preferably, the data format field 414 stores identification information identifying an organization (format owner) such as groups or business enterprises, etc. that defines the data representing methods, and identification information identifying the data types enrolled and known by the format owner.

The field 415 storing information on the user identification elements corresponding to the user identification data stores information on which user identification data is the data corresponding to any one of various elements required for recognizing users. For example, in the case of recognizing users interacting with a robot, the user identification elements information field 415 in the header region 301 stores the information on which user identification data stored in the data region 302 is the data corresponding to any one of the user identification elements, such as a face, a voice, clothes, textures of clothes, movement of lips, a gait of a user, and a user identification code, etc.

According to the data structure as above, since the user identification element information, the data format information, and the information on the processing speed and the processing states are stored in the header region 301, the data structure can represent the user identification data, regardless of which user identification data is the data for any of the user identification elements, which user identification data is represented with any kinds of the data formats, or which user identification data is the data having any processing speed and processing states. As a result, the data structure that can generally represent the user identification data used for recognizing the users is defined, and the user identification data represented with the data structure as above is used for performing the user identification API included in a robot application program to recognize the users.

The user identification API (RuicAPI) for a URC includes a function required for an interface that makes application programs used for recognizing users by using a voice or an image of an intelligent robot to be compatible with program developers.

An access to the user identification method for the URC is performed in accordance with a standard interface defined in the present invention, and the RUIC (Robot User Identification Component) provided by the business enterprises using the standard interface may be used for all the application programs using the RuicAPI.

The API is designed to be used by developers of the application programs and developers of the user identification technologies and is simply and intuitively designed to make technology convergence and technology compatibility easy. Also, the API is designed to avoid technology complexity involved in providing the extension of the user identification technology. The access method provides generality for the interface of the user identification technologies for a potential URC and the application programs.

The API includes basic functions, such as enrollment, and verification, identification, etc., and provides functions to manage executions, such as capture of data in a robot, and enrollment, verification, and identification in a server, etc.

A basic model of all types of the user identification technologies depends on the following format. Templates are first configured upon initially enrolling users. This process is achieved by collecting several samples from some sensors and extracting characteristics that become their features from the samples collected. Then, the results are used to configure the templates. Such an initial template configuration process is referred to as enrollment. The initial template is stored by the application program. After processing the newly captured samples to be in useable forms, a matching process of them with the templates is referred to as verification. An informing process of values most approaching the samples by matching the samples with a set of the templates and then returning a list of the matched results is referred to as identification.

As the information used for recognizing users, a face, a voice, a height, clothes, movement of lips, a gait of a user, and a user identification code, etc. may be used. A database for many people should be built in order to perform the processes of enrollment, verification, and identification in the user identification API component and functions for accessing the database should be defined.

In the RuicAPI, the templates of the UIR are stored in its database. For the purpose of enrolling templates of new users in the database so as to recognize the users or fetching the templates to match new samples with the templates existing in the database so as to verify and identify them, and the like, functions for accessing to the database are needed. To this end, the functions are proposed as follows.

RUIC_DbOpen
    RUIC_RETURN RUIC_DbOpen
    (const uint8 *DbName,
    RUIC_DB_ACCESS_TYPE AccessRequest,
    RUIC_DB_HANDLE *DbHandle);

This function opens a DB with a designated name using a designated access method.

Parameters
    DbName (input)—a pointer for a null-terminated string including a name of a database.
    AccessRequest (input)—pointing out a processing method requested for a database for reading and writing, respectively.
    DbHandle (output)—a handle for storing opened data. If function fails, values will be set to be BioAPI_DB_INVALID_HANDLE.

Return Values
    RUIC_RETURN value points out a success or describes partial error conditions.
    RUIC_OK value points out a success. All other values represent error conditions.

Error
    RUIC_ERR_UNABLE_TO_OPEN_DATABASE
    RUIC_ERR_DATABASE_IS_LOCKED
    RUIC_ERR_DATABASE_DOES_NOT_EXIST
    RUIC_ERR_INVALID_DATABASE_NAME
    RUIC_ERR_INVALID_ACCESS_REQUEST
    See RUIC Error Handling.
    RUIC_DbClose
    RUIC_RETURN RUIC_DbClose
        (RUIC_DB_HANDLE DbHandle);

This function closes the opened database. All cursors are established at current state when the database is released.

Parameters
    DbHandle (input)—a DB handle for an opened database. This describes the opened database to be closed.

Return Value
    RUIC_RETURN value points out a success or describes partial error conditions. RUIC_OK value points out a success. All other values represent error conditions.

Error
    RUIC_ERR_UNABLE_TO_CLOSE_DATABASE
    RUIC_ERR_DATABASE_DOES_NOT_EXIST
    See BioAPI Error Handling.
    RUIC_DbCreate
    RUIC_RETURN RUIC_DbCreate
        (const uint8 *DbName,
        RUIC_DB_ACCESS_TYPE AccessRequest,
        RUIC_DB_HANDLE *DbHandle);

This function is to create a new database and activate it. A name of the new database is described by an input parameter DbName. The newly created database is opened with a designated access method.

Parameters
    DbName (input)—a pointer for a null-terminated string including a name of a new database.
    AccessRequest (input)—an indicator of a processing method requested for a database in reading or writing, respectively.
    DbHandle (output)—a handle for storing newly created and opened data. If the function fails, this value will be set to be RUIC_INVALID_HANDLE.

Return Value
    RUIC_RETURN value points out a success or describes partial error conditions. RUIC_OK value points out a success. All other values represent error conditions.

Error
    RUIC_ERR_DATABASE_ALREADY_EXISTS
    RUIC_ERR_INVALID_DATABASE_NAME
    RUIC_ERR_INVALID_ACCESS_REQUEST
    See RUIC Error Handling.
    RUIC_DbDelete
    RUIC_RETURN RUIC_DbDelete
        (const uint8*DbName);

This function removes information of all states associated in the database and all records from the database designated.

Parameters
    DbHandle (input)—a pointer for a null-terminated string including a name of a database to be removed.

Return Value
    RUIC_RETURN value points out a success or describes partial error conditions. RUIC_OK value points out a success. All other values represent error conditions.

Error
    RUIC_ERR_DATABASE_IS_OPEN
    RUIC_ERR_INVALID_DATABASE_NAME
    See RUIC Error Handling.
    RUIC_DbStoreUIR
        RUIC_RETURN RUIC_DbStoreUIR
        (const RUIC_UIR *UIRToStore,
        RUIC_DB_HANDLE DbHandle,
        RUIC_UUID *Uuid);

The UIR passing into UIRToStore parameter is stored in the opened database passing into DbHandle parameter. If the UIRToStore is the UIR handle, the input UIR handle will be released. If the UIRToStore is a database key value, the UIR will be copied into the opened database. A new UUID is assigned to the new UIR in the database. Later, this UUID can be used as a key value for accessing the UIR.

Parameters
    UIRToStore (input)—UIR is their handle or UIR is stored in an activated database, which may be an index in other activated databases.
    DbHandle (input)—a handle for an activated database.
    Uuid (output)—UUID recognizes a new UIR in the database. This UUID cannot be changed. If a user is associated with other BIR, then it is necessary to erase one of the previous UUIDs so that only new one UUID exists in the database. Such a previous UUID is substituted with the new UUID in the application program technology database Return Value
    RUIC_RETURN value points out a success or describes partial error conditions.
    RUIC_OK value points out a success. All other values represent error conditions.

Error
    See RUIC Error Handling.
    RUIC_DbGetUIR
        RUIC_RETURN RUIC_DbGetUIR
        (RUIC_DB_HANDLE DbHandle,
        const RUIC_UUID *KeyValue,
        RUIC_UIR_HANDLE *RetrievedUIR);

"UIR to which KeyValue points" of "a database to which DbHandle parameter points" is fetched. The handle of UIR is returned.

Parameters
    DbHandle (input)—a handle for an activated database.
    KeyValue (input)—a key in the database of BIR to be retrieved.
    RetrievedUIR (output)—a handle for the retrieved BIR.

Return Value
    RUIC_RETURN value points out a success or describes partial error conditions.
    RUIC_OK value points out a success. All other values represent error conditions.

Error
    RUIC_ERR_RECORD_NOT_FOUND
    See RUIC Error Handling.
    RUIC_DbDeleteUIR
    RUIC_RETURN RUIC_DbDeleteUIR
        (RUIC_DB_HANDLE DbHandle,
        const RUIC_UUID*KeyValue);

"UIR to which KeyValue points" of "a database to which DbHandle points" is removed.

Parameters
    DbHandle (input)—a handle for an activated database
    KeyValue (input)—UUID of UIR to be removed.

Return Value
    RUIC_RETURN value points out a success or describes partial error conditions.
    RUIC_OK value points out a success. All other values represent error conditions.

Error
    RUIC_ERR_RECORD_NOT_FOUND
    RUIC_ERR_END_OF_DATABASE
    See RUIC Error Handling.

Meanwhile, after each function of the user identification API completes its function, the functions should then return whether the functions succeed or not. If fails, it should return causes of errors. At this time, kinds of errors are normalized to prevent the confusion between the users of the API and the manufacturers of the component.

A specific representation for an error handling in RuicAPI will be described. Related mechanisms for returning errors are returned to a caller and can be conformed to a wide range of operating system schemas.

All RuicAPI functions return RUIC_RETURN type of values. The RUIC_OK value points out that this function succeeds, and other values point out error values. Authorization is made by returning the error values captured by the RuicAPI, and the error value is also defined by a service provider.

The kinds and values of the errors are defined as follows.

define RUIC_BASE_ERROR
A base error is defined by a service provider.
define RUIC_ERR_UNABLE_TO_CAPTURE (RUIC_BASE_ERROR+1)
It is not possible to capture samples.
define RUIC_ERR_TOO_MANY_HANDLES (RUIC_BASE_ERROR+2)
It can no longer have a space for assigning a UIR handle.
define RUIC_ERR_TIMEOUT_EXPIRED (RUIC_BASE_ERROR+3)
Since timeout value is expired, a function is terminated.
define RUIC_ERR_INVALID_UIR_HANDLE (RUIC_BASE_ERROR+4)
An input UIR is not valid.
define RUIC_ERR_UIR_SIGNATURE_FAILURE (RUIC_BASE_ERROR+5)
A signature on UIR is not valid.
define RUIC_ERR_UNABLE_TO_IMPORT (RUIC_BASE_ERROR+6)
It is not possible to configure UIR from input data.
define RUIC_ERR_TYPE_MISMATCH (RUIC_BASE_ERROR+7)
Data types of two UIRs to be compared are not conformed to each other.
define RUIC_ERR_TYPE_MEMORY_ERROR (RUIC_BASE_ERROR+9)
Memory access error
define RUIC_ERR_UNABLE_TO_OPEN_DATABASE (RUIC_BASE_ERROR+256)
It is not possible to open a specific database.
define RUIC_ERR_DATABASE_IS_LOCKED (RUIC_BASE_ERROR+257)
Since a database is fixed, it cannot be opened for a requested processing.
define RUIC_ERR_DATABASE_DOES_NOT_EXIST (RUIC_BASE_ERROR+258)
There is no a specific database.
define RUIC_ERR_DATABASE_ALREADY_EXISTS (RUIC_BASE_ERROR+259)
Since a database has already existed, a database creation fails.
define RUIC_ERR_INVALID_DATABASE_NAME (RUIC_BASE_BSP_ERROR+260)
Invalid database name
define RUIC_ERR_RECORD_NOT_FOUND (RUIC_BASE_ERROR+261)
A record corresponding to a requested key cannot be found.
define RUIC_ERR_DATABASE_IS_OPEN (RUIC_BASE_ERROR+262)
A database has already been opened.
define RUIC_ERR_INVALID_ACCESS_REQUEST (RUIC_BASE_ERROR+263)
It is not possible to recognize processing types.
define RUIC_ERR_END_OF_DATABASE (RUIC_BASE_ERROR+264)
The end of a database was found.
define RUIC_ERR_UNABLE_TO_CREATE_DATABASE (RUIC_BASE_ERROR+265)
It is not possible to create a database.
define RUIC_ERR_UNABLE_TO_CLOSE_DATABASE (RUIC_BASE_ERROR+266)
It is possible to close a database
define RUIC_ERR_UNABLE_TO_DELETE_DATABASE (RUIC_BASE_ERROR+267)
It is not possible to delete a database.

Vision-based identification is to grasp a distance or a position from a person or a thing through image identification among identification records for a variety of users. A recognizer performing the vision-based identification is included in various apparatuses, such as an intelligent service robot or a surveillance camera, etc., as a means for recognizing images.

The vision-based identification according to the present invention is performed using image information for clothes among various image information to recognize and track specific users wearing the clothes by recognizing the clothes with specific colors and textures (patterns).

The vision-based identification is performed by previously building a database of image data for at least one clothes with specific colors and textures, capturing image information for clothes captured by the vision-based recognizer, and judging whether the image information for the clothes correspond to any one of the data for the clothes stored in the database.

Accordingly, in order to perform the vision-based identification, it is necessary to previously build a database by capturing data for at least one clothes. The data for the at least one clothes can be varied depending on the colors and textures of the clothes. In one example of the database, the colors include all colors able to be represented in a RGB color space and the textures include a vertical pattern, a horizontal pattern, a cross pattern, no pattern, and other atypical patterns.

The data for the clothes can be varied depending on lighting projected on the clothes, in addition to the colors and textures of the clothes. Therefore, the present invention should consider the facts that the image data can be varied depending on the lighting and that the image data in the database of the clothes images can also be varied depending on the lighting by considering, in order to perform the vision-based identification.

A method for building a database of clothes images for the vision-based identification according to the present invention is performed by capturing and storing the image data for at least one clothes with different colors or textures (patterns), and the image data for the respective clothes is configured of the captured image data for each of at least one different lighting projected on the clothes.

In particular, it is preferable that the lighting projected on the respective clothes captures the image data for the clothes by using different brightness and spectrum characteristics.

Figure 5:
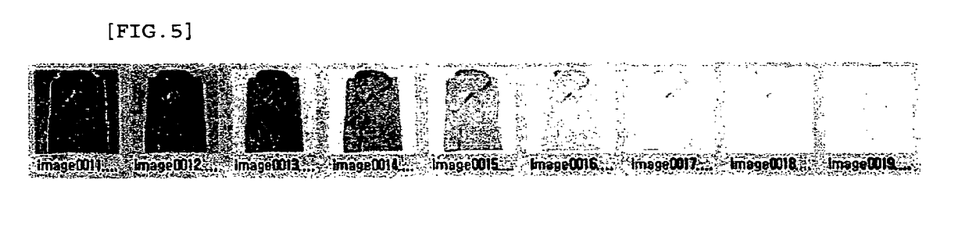
FIG. 5 and FIG. 6 show one example of image data captured by projecting different light on clothes with specific colors and textures.
Figure 6:
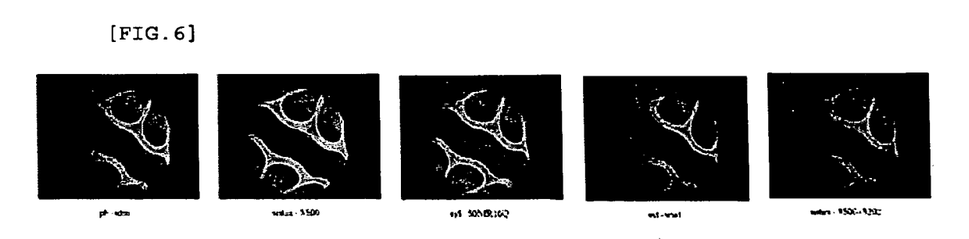

FIG. 5 and FIG. 6 show one example of image data captured by projecting different lighting on clothes with specific colors and textures.

FIG. 5 shows the image data captured by projecting different lighting in brightness on clothes with specific colors and textures, wherein the image data are image data of the case of changing brightness of lighting to the range of 400 to 800 lux in general indoor environments.

FIG. 6 shows the changing shape of the image data when lighting with different spectrum characteristics is projected on a specific object. If the spectrum characteristics of the lighting are varied, major colors projected by the lighting are varied so that the image data for the clothes are varied.

Figure 7:
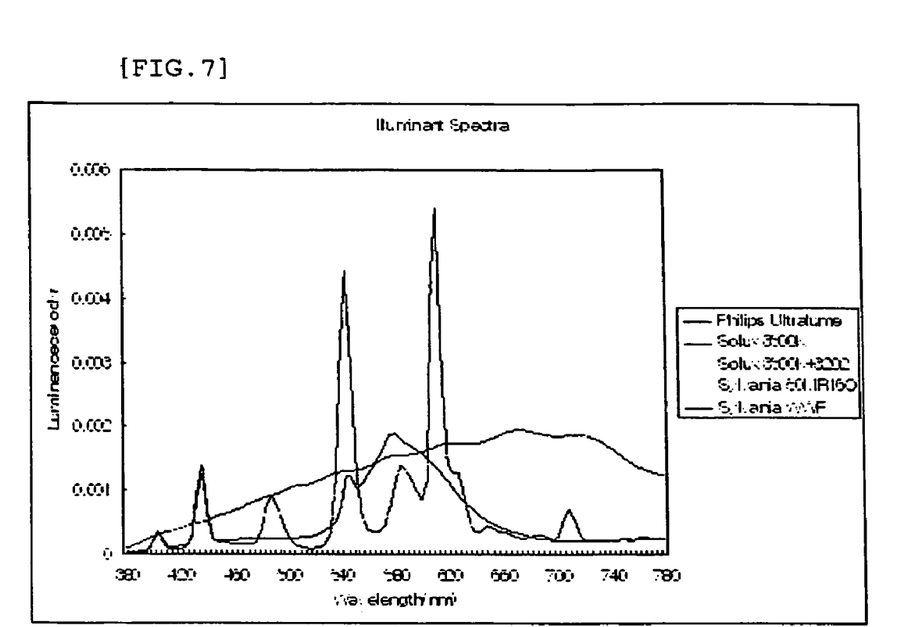
FIG. 7 shows spectrum characteristics of lighting used in one embodiment of a method for building a database of clothes images according to the present invention.

FIG. 6 shows the change of the image data of a case using the lighting of Sylvania 50MR16Q(12VDC), Solux 3500K (12VDC), Solux 3500K(12VCD)+Roscolux3202, Sylvania Warm White Fluorescent(110VAC), Philips Ultralume Fluorescent(110VAC), as the lighting with different spectrum characteristics. FIG. 7 shows the spectrum characteristics of the lighting.

Figure 8:
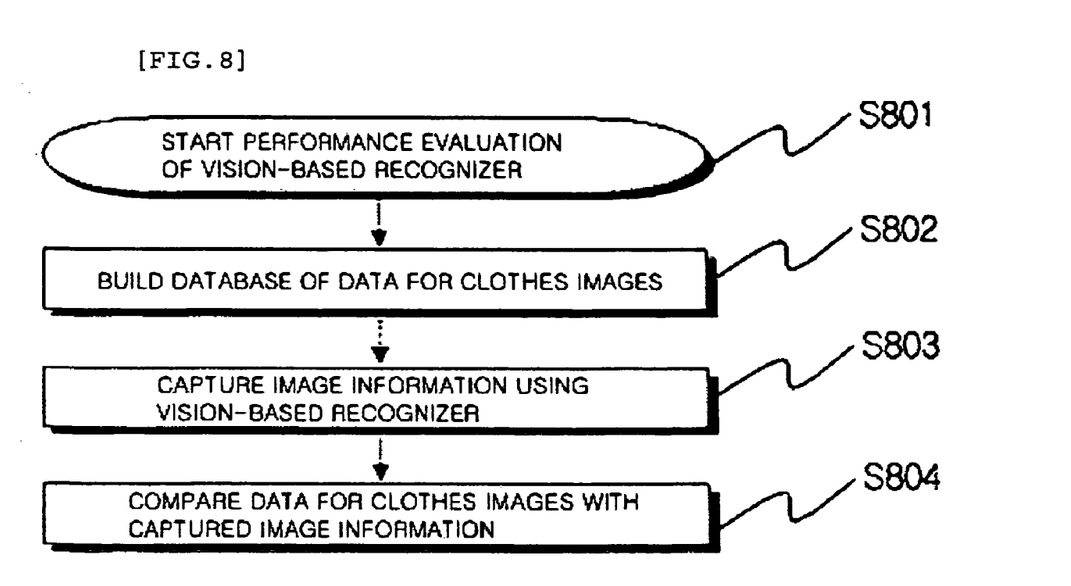
FIG. 8 is a flow chart showing a process performing one embodiment of a method for evaluating a performance of a vision-based recognizer according to the present invention.

FIG. 8 is a flow chart showing a process performing one embodiment of a method for evaluating a performance of a vision-based recognizer according to the present invention.

In FIG. 8, the method for evaluating the performance of the vision-based recognizer is performed by including the steps of: building a database of clothes images for vision-based identification by capturing image data for at least one clothes (S802); capturing image information for specific clothes by using the vision-based recognizer (S803); judging whether or not the images for the clothes are the same by comparing the image information captured by the vision-based recognizer with the image data in the database of the clothes images (S804).

The step (S802) building the database of the clothes images captures and stores the image data for at least one clothes. Each of the at least one clothes has specific colors and textures. The image data are captured when projecting at least one different lighting on each of the clothes. Accordingly, the image data is stored by the number of cases of making lighting conditions for clothes with specific colors and textures different. Preferably, in particular, to make the lighting conditions different is to make the brightness of light or spectrum characteristics of lighting different.

Preferably, the step (S803) capturing the image information for the specific clothes by using the vision-based recognizer captures the image information for the clothes included in the database built in the step (S802).

The object of the present invention is to evaluate the performance of the vision-based recognizer. In particular, the object of the present invention is to evaluate the performance for judging whether or not the image information for the clothes captured by the vision-based recognizer corresponds to the image information for any one of the clothes included in the database.

Accordingly, it is preferable that the vision-based recognizer captures the image information for the same clothes in colors and textures as one of the clothes for which the image data are stored in the database and judges whether it can accurately discriminates the corresponding clothes in the database from the captured image information. In this case, it is possible to objectively judge the performance of the vision-based recognizer.

The step (S804) judging whether or not the images for the clothes are the same by comparing the image information captured by the vision-based recognizer with the image data in the database of the clothes images is a step judging whether the image information for the clothes captured in the step (S803) corresponds to which clothes in the database built in the step (S802).

When the image information for the clothes is captured in the step (S803), the step (S804) judges whether or not the image data in the database conform to the image information captured in the step (S803) by comparing therebetween. That is, it is judged whether or not the respective image data in the database is image data for the clothes with the same colors and textures as the clothes identified in the step (S803).

At this time, the database of the clothes images stores the image data by the number of different lighting conditions for the same clothes as those identified in the step (S803), wherein it is judged that some or all of the image data are image data for the clothes of the same colors and textures as the identified clothes. If they are accurately judged, the image data exactly judged are referred to as identification succeeding data.

The accuracy of the judged results in the step (S804) becomes a reference for evaluating the performance of the vision-based recognizer. The present invention suggests detection rate and false positive as indexes indicating the performance of the vision-based recognizer.

The detection rate indicates data rate judged by accurate results among the data for the same clothes as the identified clothes among the image data in the database in the step (S804), when the vision-based recognizer identifies the clothes with the specific colors and textures and captures the image information thereof in the step (S803). That is, the detection rate for the clothes with the specific colors and textures is expressed at the ratio of the number of the overall image data for the specific clothes to the number of the identification succeeding data.

The detection rate can be captured for the respective clothes stored in the database as described above and can also be captured for all clothes stored in the database. The detection rate for all clothes stored in the database can be obtained as follows.

$$\text{detection rate }(\%) = \frac{1}{M}\sum_{i=1}^{M}\frac{N_{success}(i)}{N_{total}(i)} \times 100$$

In the above equation, M indicates the number of kinds of clothes stored in the database, $N_{total}(i)$ indicates the number of the image data for the respective clothes, and $N_{success}(i)$ indicates the number of the identification succeeding data among the image data.

The false positive indicates the number of data judged for the same clothes as the identified clothes among the data for the clothes different from the identified clothes among the image data in the database in the step (S804), when the vision-based recognizer identifies the clothes with the specific colors and textures and captures the image information thereof in the step (S803).

Figure 9:
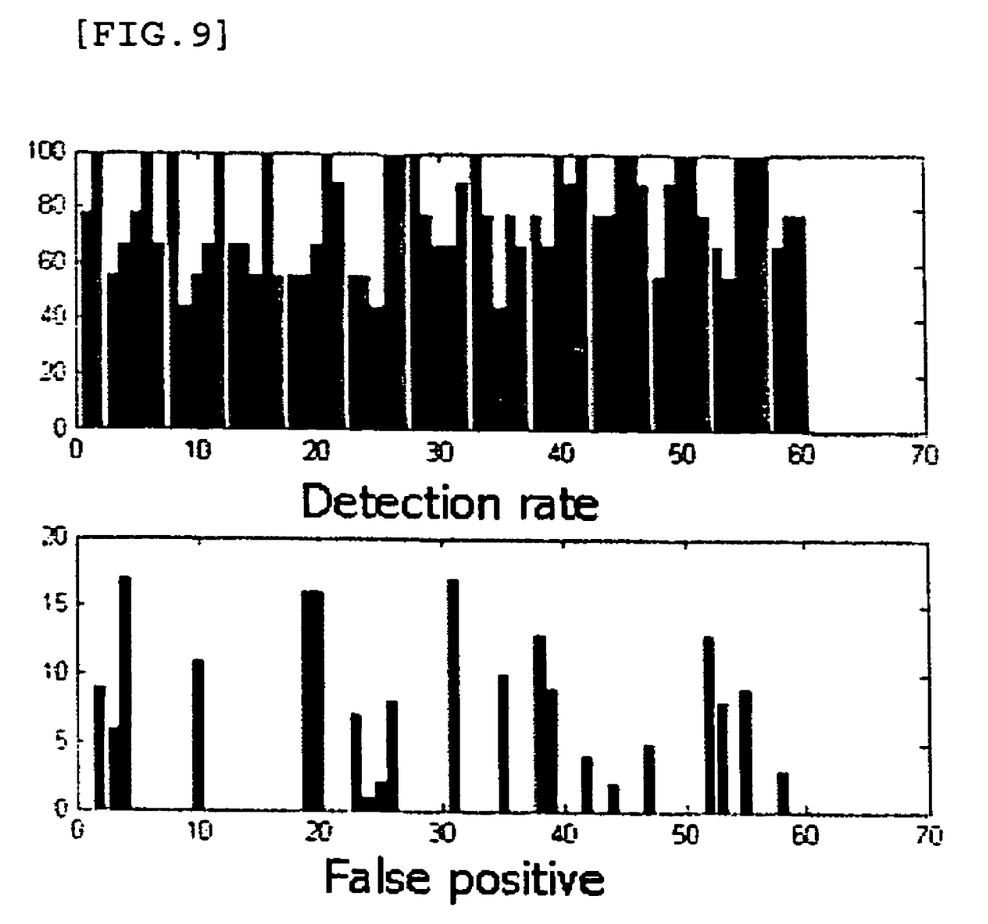
FIG. 9 shows one example of the performance evaluating results by one embodiment of the method for evaluating the performance of the vision-based recognizer according to the present invention.

The false positive indicates the case that the image data to be judged as the image data for the clothes different from the identified clothes in the step (S803) is falsely judged as the image data for the same clothes as the identified clothes. That is, it indicates the number of the image data falsely judged, and is an opposite concept to the detection rate FIG. 9 shows one example of the measurement results of detection rate and false positive by building a database for 60 kinds of clothes by one embodiment of a method for evaluating the performance of the vision-based recognizer according to the present invention.

The performances of identification success degree, and mistaken identification and misjudgment degree, etc. of the vision-based recognizer used can objectively be evaluated from the measurement values of the detection rate and the false positive measured.

Although a few embodiments of the present invention have been shown and described, it would be appreciated by those skilled in the art that various modifications and changes might be made in this embodiment of the present invention without departing from the principles and spirit of the invention described in the claims below.

As described above, according to the present invention, a data structure is defined, which can generally represent user identification data used in recognizing a user in hardware, such as a robot, etc.

Further, the present invention is used for recognizing a user by using a general data structure to be represented various user identification data in recognizing a user in hardware, such as a robot, etc.

In particular, the present invention can build a vision-based identification method using image information for clothes and a database of clothes images for evaluating a performance of a vision-based recognizer and can objectively evaluate the performance of the vision-based identification method and the vision-based recognizer in accordance with objective references.

Also, the present invention can perform functions, such as enrollment, addition, and deletion of templates, etc. in a database by defining database access functions in a user identification S/W component API and prevent the confusion between the users of the API and the manufacturers of the component by defining kinds of errors when the errors occur among values returned by each function.

What is claimed is:

1. A user identification method, comprising:

enrolling to configure and store user identification data templates by capturing specific user identification data as a sample;

measuring and collecting the user identification data;

verifying to match the collected user identification data with the stored user identification data templates; and identifying to judge user identification result by the matched results, wherein the user identification data in the enrolling and verifying steps are configured by a data structure written in a record media written for recognizing a user, the record media being written with the user identification data used in a user identification software component application (API) programming interface, the record media including, a header region storing information on a length, a kind, and a format of the user identification data, and a data region storing the user identification data wherein the header region includes a field storing the information on the length of the user identification data, a field storing the information on the format of the user identification data, a field storing information on a processing speed of the user identification data, a field storing information on whether the user identification data is encrypted, and a field storing information on an user identification element corresponding to the user identification data.

* * * * *